(12) United States Patent
Agrawal et al.

(10) Patent No.: US 9,037,700 B2
(45) Date of Patent: May 19, 2015

(54) PREDICTIVE PLACEMENT OF CONTENT THROUGH NETWORK ANALYSIS

(75) Inventors: Dakshi Agrawal, Monsey, NY (US); Jorge Lobo, New York, NY (US); Vasileios Pappas, Elmsford, NY (US); Petros Zerfos, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 13/097,573

(22) Filed: Apr. 29, 2011

(65) Prior Publication Data

US 2012/0278476 A1    Nov. 1, 2012

(51) Int. Cl.
| | |
|---|---|
| G06F 15/173 | (2006.01) |
| G06Q 50/00 | (2012.01) |
| H04N 21/258 | (2011.01) |
| H04N 21/433 | (2011.01) |
| H04N 21/442 | (2011.01) |
| H04N 21/45 | (2011.01) |
| H04N 21/858 | (2011.01) |

(52) U.S. Cl.
CPC .............. *G06Q 50/01* (2013.01); *H04N 21/258* (2013.01); *H04N 21/4331* (2013.01); *H04N 21/44222* (2013.01); *H04N 21/4524* (2013.01); *H04N 21/8586* (2013.01)

(58) Field of Classification Search
CPC ..................... G06F 17/30867; G06F 17/30598; G06F 17/30241; G06F 17/30864; G06F 2201/86; H04L 51/046; H04L 47/823; G06Q 50/01; G06Q 30/0269
USPC .......................... 709/223–224, 203, 231, 217
See application file for complete search history.

(56) References Cited

U.S. PATENT DOCUMENTS

| | | | |
|---|---|---|---|
| 8,509,816 B2 * | 8/2013 | Branch et al. .............. 455/456.3 |
| 8,527,525 B2 * | 9/2013 | Fong et al. .................... 707/751 |
| 2003/0065712 A1 | 4/2003 | Cheung et al. |
| 2004/0143428 A1 * | 7/2004 | Rappaport et al. .............. 703/22 |
| 2009/0054043 A1 * | 2/2009 | Hamilton et al. .......... 455/414.2 |
| 2009/0204600 A1 * | 8/2009 | Kalik et al. ........................ 707/5 |
| 2009/0312033 A1 * | 12/2009 | Shen et al. ................. 455/456.1 |
| 2010/0057563 A1 | 3/2010 | Rauber et al. |
| 2010/0085947 A1 * | 4/2010 | Ringland et al. .............. 370/338 |
| 2010/0217720 A1 * | 8/2010 | Jones et al. .................... 705/319 |
| 2010/0274760 A1 * | 10/2010 | Diot et al. ...................... 707/627 |
| 2010/0279708 A1 * | 11/2010 | Lidsrom et al. ............ 455/456.1 |
| 2010/0306249 A1 * | 12/2010 | Hill et al. ....................... 707/769 |
| 2010/0318484 A1 * | 12/2010 | Huberman et al. ............. 706/46 |
| 2010/0324704 A1 * | 12/2010 | Murphy et al. ................. 700/94 |
| 2011/0276632 A1 * | 11/2011 | Anderson et al. ............. 709/205 |

OTHER PUBLICATIONS

Sastry et al., "Buzztraq: Predicting geographical access patterns of social cascades using social networks", Mar. 31, 2009, 7 pp., Second ACM Workshop on Social Networking Systems, Nuremberg, Germany, Copyright 2009, ACM, New York, New York.

* cited by examiner

*Primary Examiner* — Wing F Chan
*Assistant Examiner* — Benjamin M Thieu
(74) *Attorney, Agent, or Firm* — Ference & Associates LLC (57) ABSTRACT

Described herein are methods, systems, apparatuses and products for predictive placement of content through network analysis. An aspect provides for intercepting content upload data provided by one or more users indicating content at a network location; ascertaining one or more users predicted to access said content based on said one or more users providing said content upload data; and placing said content to one or more other network locations based on said one or more users predicted to access said content. Other embodiments are disclosed.

19 Claims, 6 Drawing Sheets

PREDICTIVE PLACEMENT OF CONTENT THROUGH NETWORK ANALYSIS

FIELD OF THE INVENTION

The subject matter presented herein generally relates to intelligent content placement in a network.

BACKGROUND

Content Distribution Networks (CDNs) place content in their points of presence (PoPs) either based on the popularity of the content or based on service level agreements (SLAs) with the content providers. Predicting the popularity of content or its access locality is done either retroactively (only after the content has already become popular at a global, national or regional scale), or proactively (when there is strong indication by the content providers that the content is expected to become popular).

According to various reports, some main drivers behind the growth of mobile data are social networks and streaming video. Social networks have become a dominant point of entry for the web. On social networks, a large fraction of the bandwidth is consumed by video and photographs shot by using a handheld and uploaded to the social network, which is then downloaded by people within the social circle of the user that uploaded the content.

BRIEF SUMMARY

One aspect provides a computer program product comprising: a computer readable storage medium having computer readable program code embodied therewith, the computer readable program code comprising: computer readable program code configured to intercept content upload data provided by one or more users indicating content at a network location; computer readable program code configured to ascertain one or more users predicted to access said content based on said one or more users providing said content upload data; and computer readable program code configured to place said content to one or more other network locations based on said one or more users predicted to access said content.

Another aspect provides a method comprising: intercepting content upload data provided by one or more users indicating content at a network location; ascertaining one or more users predicted to access said content based on said one or more users providing said content upload data; and placing said content to one or more other network locations based on said one or more users predicted to access said content.

A further aspect provides a system comprising: at least one processor; and a memory device operatively connected to the at least one processor; wherein, responsive to execution of program instructions accessible to the at least one processor, the at least one processor is configured to: intercept content upload data provided by one or more users indicating content at a network location; ascertain one or more users predicted to access said content based on said one or more users providing said content upload data; and place said content to one or more other network locations based on said one or more users predicted to access said content.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

In this regard, example embodiments are described throughout with a focus on social network related content uploaded by users via their devices (such as handheld mobile devices) via a cellular network. However, these example embodiments are provided as non-limiting, representative examples, and those having ordinary skill in the art will readily appreciate that the techniques, methods, systems, and products described herein have broad applicability to other types of content, devices and/or networks. Some examples of other types of content, devices, networks and the like, as well as variations they may introduce, are noted throughout.

In most cases, the popularity of a video or a photograph is a micro-phenomenon (that is, popular at a school, in a family, in a social group with a typical size of a few hundred or less). Conventional mechanisms for predicting popularity and providing content placement within a network are insufficient given such micro-phenomenon. Apart from content locked within a social networking site, social networks also create traffic for other sites, as they are used as sources of referrals for web content whose popularity increases as it is disseminated in the social network in a viral fashion. This is also evident from reports about social networks exceeding referrals from search engines. In particular, for sites that take up a large amount of bandwidth, such as YOUTUBE video sharing web site, the links are disseminated through social networks/status updates. Users then download content from the video sharing web site after they receive link from their contacts, which acts as a form of implicit endorsement. YOUTUBE is a registered trademark of Google, Inc. in the United States and other countries.

Here again, micro-phenomena play a big role. A very small fraction of such videos are popular at the global/national/regional scale. The videos are highly diverse (raw food cooking, guitar practice in a school, et cetera) that appeal only to a few hundred/thousands of users and their access is highly correlated with structures in the social networks. Unless social structure is exploited in contend distribution networks (CDNs), CDNs may not be able to serve these micro-phenomena efficiently, and their performance will reach a plateau dictated by the fraction of regional/national/global scale popular videos among all the video that is watched by a typical user.

Accordingly, an embodiment provides mechanisms for effectively discovering the long-tail of the popularity distribution of electronic content by exploiting social network information in order to facilitate efficient dissemination of the content to the users. An embodiment provides for intercepting of content uploads of multi-media content (such as video/image content or links thereto) as opposed to only intercepting multi-media that is being requested by other users. An embodiment provides for creating spatio-temporal trajectories of users using association point data, for example data that is captured by telecom operators and is available for off-line or on-line analysis. An embodiment provides for re-creating a social network of users, for example, such as relationships being re-created by telecom operators for marketing purposes such as by exploiting information in call detail records (CDRs). An embodiment also provides for driving caching decisions (for push and pull of content) based on social network and/or spatio-temporal information of the users. As will be understood more fully by reference to the example embodiments described in detail herein, a match between bandwidth management techniques and underlying causes of explosive data growth may thus be obtained.

The description now turns to the figures. The illustrated example embodiments will be best understood by reference to the figures. The following description is intended only by way of example and simply illustrates certain example embodiments representative of the invention, as claimed.

Figure 1:
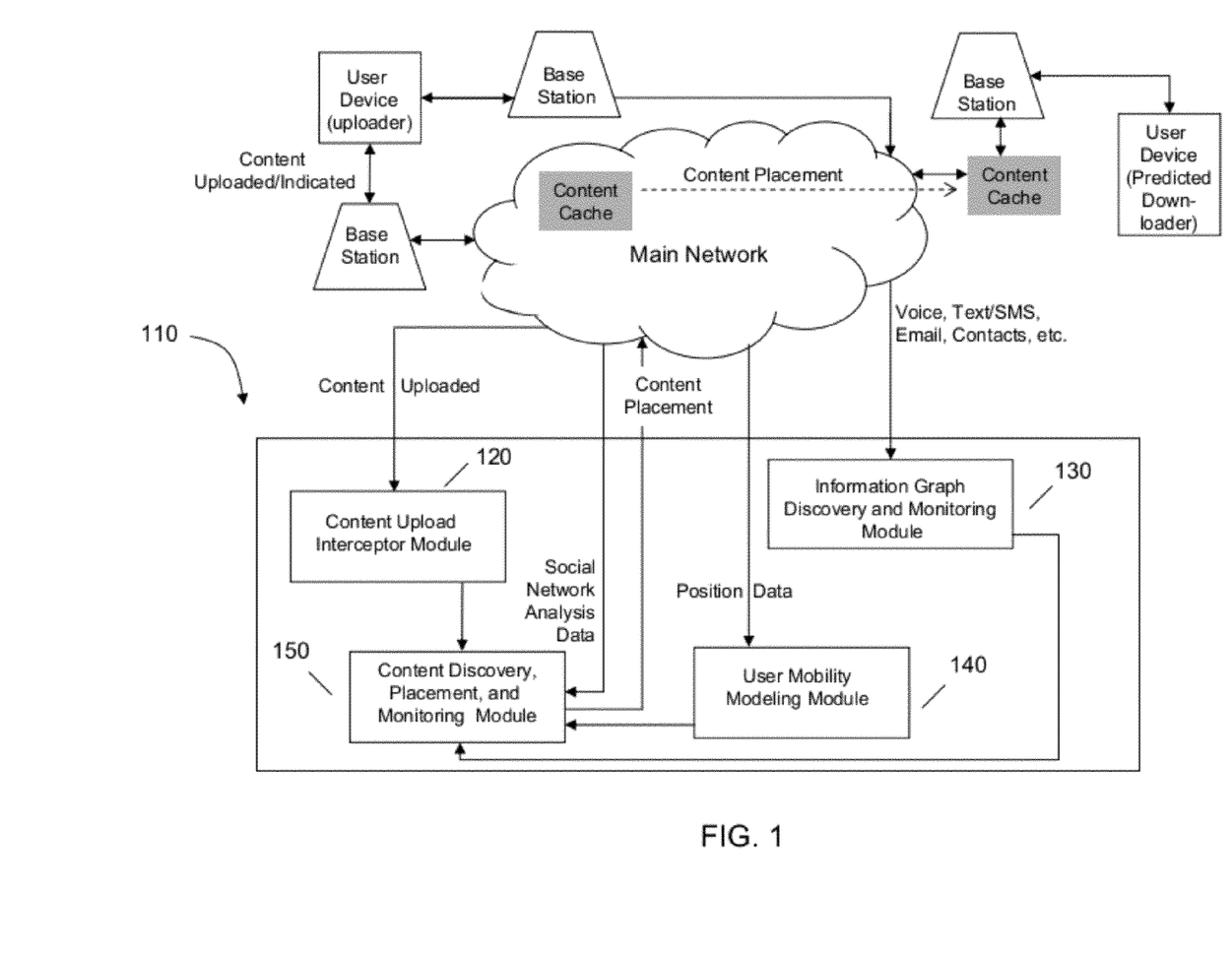
FIG. 1 illustrates an example system for predictive placement of content.

Referring to FIG. 1, an example embodiment of a system 110 is described in detail in the context of a cellular network provider (CNP). However, those having ordinary skill in the art will recognize that different embodiments may operate in different contexts. For example, variations of the example system described herein may operate in the context of an Internet service provider (ISP), in the context of multiple CNPs and/or ISPs, or in other network contexts generally.

The example system 110 may include a content upload interceptor module 120. The content upload interceptor module 120 discovers content in user's upload data (for example, user social network posting data providing a link to content such as a video or a picture, a user email to a social networking site including the content such as a video, and the like) that is potentially useful for caching within a CDN. The content upload interceptor module 120 examines the content upload data on the fly and extracts information objects (such as the content indicated by the content upload data) that take up bandwidth and thus are potential candidates for caching.

In order to examine the uploaded content, the content upload interceptor module 120 may employ a variety of techniques. For example, the content upload interceptor module 120 may employ deep packet inspection techniques. Or, as another example, simpler techniques may be employed. For example, simple URL based heuristics (such as upload URL for a photo album site information) may be employed, as may use of a control signal from mobile device (such as a control signal to the base station that uses mobile device's monitoring capabilities to send additional metadata to the base station, alerting it to the possibility of a content upload that should be cached).

The example system 110 may include an information graph discovery and monitoring module 130. The information graph discovery and monitoring module 130 discovers the social network information graph, that is, the graph that can model the propagation of information on the various social networks. This may be accomplished by intercepting and analyzing various communication modalities (voice, SMS, MMS, email, TWITTER, FACEBOOK, et cetera) of a user (such as a cellular user). The information graph discovery and monitoring module 130 enables the mapping of the various social identities of the same user to a unique user identifier, such as a device IMEI, and captures the strengths and patterns of interaction between different user identifiers. Also, the information graph discovery and monitoring module 130 is responsible for monitoring (which may be continuous) of the social graphs and updates of the information graph.

The example system 110 may include a user mobility modeling module 140. The user mobility modeling module 140 is responsible for tracking users' locations and constructing mobility models for each user, for example based on historical data. The user mobility modeling module 140 enables the prediction of the user location in a future point in time such that intelligent, predictive caching policies may be employed. The user location at a future time window may be represented as a set of wireless base stations (for example BTS, NodeB or eNodeB) that the user can be potentially associated with (at that future time window). An association probability may also be assigned for each base station that captures the likelihood of a user being connected with the base station at the future time window.

The example system 110 may include a content discovery, placement and monitoring module 150. The a content discovery, placement and monitoring module 150 discovers content that may become popular in a micro-scale, and places it at the appropriate locations based on the potential consumers of the content, for example by using social network analysis techniques. The placement of the content can be done either passively, for example by opportunistically intercepting user initiated requests (downloads and uploads), or proactively, for example by pushing the content to the appropriate locations (CDN). The content discovery, placement and monitoring module 150 is also responsible for the scheduling of the content placement in a way that takes into consideration the load of the network. In addition, the content discovery, placement and monitoring module 150 is responsible for continually monitoring the popularity of the content and expanding its placement to other locations, based on social network analysis techniques.

Figure 2:
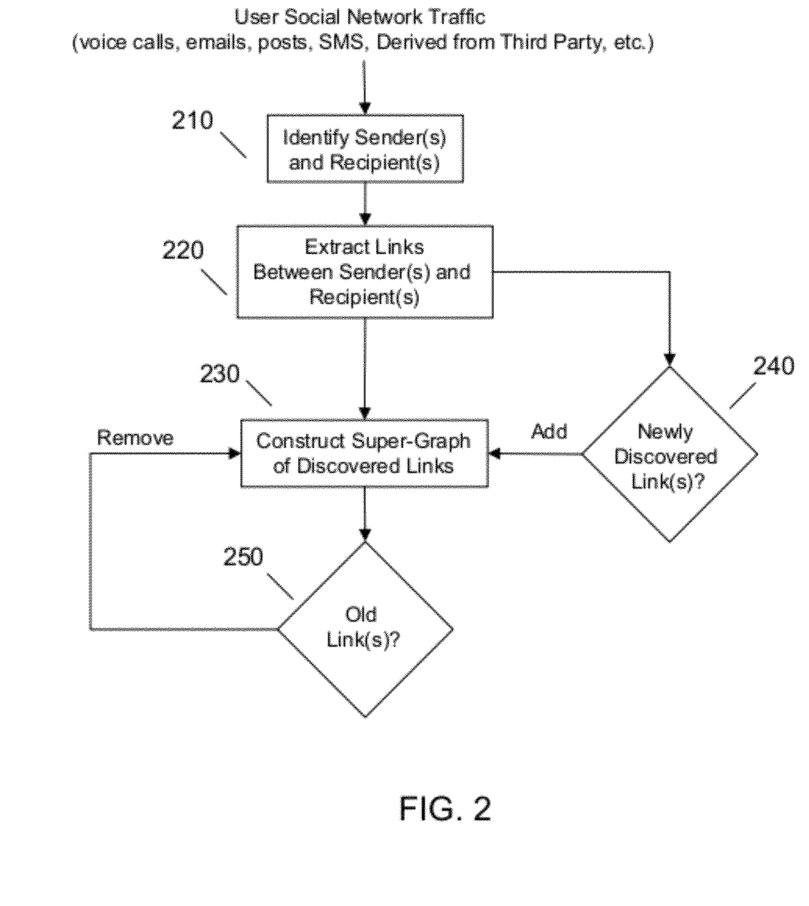
FIG. 2 illustrates an example of discovering links between users uploading/indicating content and users predicted to access the content.

Referring to FIG. 2, an example of information graph discovery and monitoring is illustrated. Given the social interaction between cellular users, the information graph discovery and monitoring module 130 constructs an information graph (super graph) that captures the possible ways that information can flow, based on network communications and social interactions (social graph). This may be accomplished for example via a network operator inspecting communication packets sent over the network to identify user network identities (for example, cellular network identities) and map these to social graphs (social identities and contacts thereof). Alternatively, a third party, such as a social network operator, may for example provide social graph information of users (such as contacts within a social network) through an application programming interface (API). The information graph may be constructed as follows.

For social graph discovery, the information graph discovery and monitoring module 130 constructs a social graph of the users. For example, the information graph discovery and monitoring module 130 may construct a social graph by intercepting traffic related to social activities and by discovering the social links. The system may also consult external, third party databases that can provide such social graph information. The social graph information represented by user network traffic may be in a variety of formats, for example voice calls, SMS/MMS messages, e-mail messages, TWEETs/messages, FACEBOOK posts, et cetera. Special social graph discovery techniques may be developed for each of type of social-related traffic. However, these social graph discovery techniques share the following characteristics. TWEET is a registered trademark of Twitter, Inc. in the United States and other countries. FACEBOOK is a registered trademark of Facebook, Inc. in the United States and other countries.

For each social-related traffic, the senders and recipients can be identified 210 with their unique IDs, relevant in the realm of the individual social network in question. The sender can be one person or multiple persons represented by one entity (for example, an e-mail distribution list). The receiver can be one person, multiple persons explicitly identified (for example, a set of e-mails), or multiple persons represented by one entity (for example, an e-mail distribution list).

Based on these characteristics the information graph discovery and monitoring module 130 extracts 220 all the pairwise links between senders and receivers. The set of links, coming from all the different types of social-related traffic, is used to construct 230 a super-graph of the discovered social graphs. This super-graph may be kept up to date by adding new links whenever they are discovered 240, and by deleting old, existing ones that have not been reconfirmed by recent discoveries 250. Optionally, weights may be given to the links depending on the frequency of their discovery.

Figure 3:
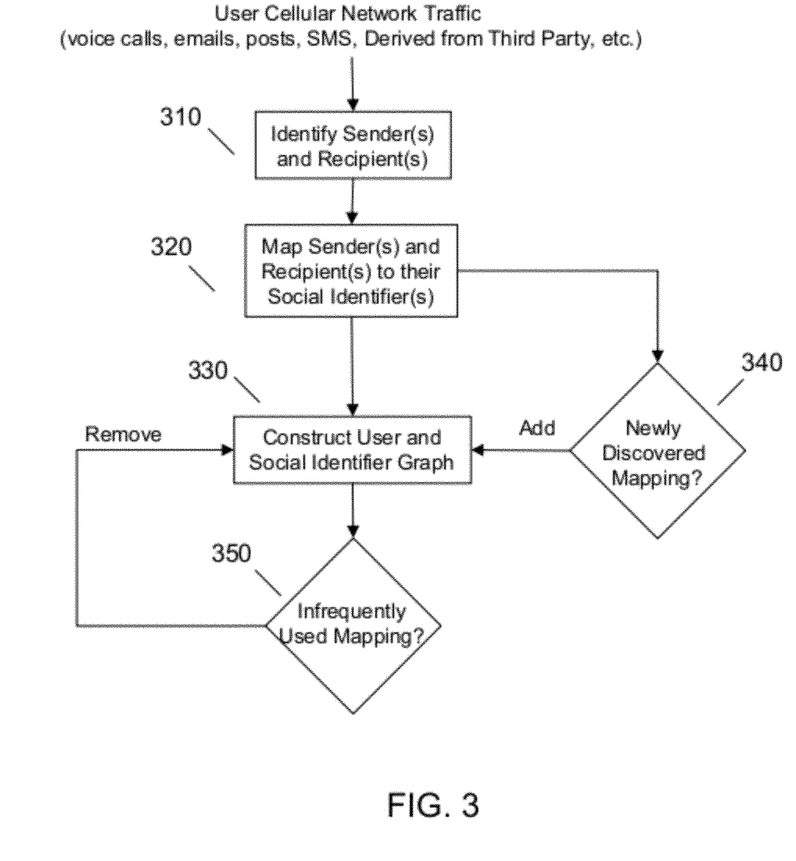
FIG. 3 illustrates an example of mapping user identifiers to users' social identifiers.

Referring to FIG. 3, an example of user and social graph mapping is illustrated. Using cellular device users as a representative example, as the cellular users are identified 310 (which may be by the cellular operator(s) (for example, with their device IMEI)), they are mapped their social identifiers 320, relevant in the realm of each individual social network (for example, e-mail address, TWITTER name, FACEBOOK name, et cetera). This may be accomplished by associating the cellular user ID with the social ID of the sender and the social ID of the receiver. For example, the social ID of the sender may be used when the social-related traffic is originated by the user's own device. This may require deep packet inspection of user traffic or optionally input by the user that provides identity in a particular social network to the network operator. For the social ID of the receiver, when the user's device is consuming the social-related traffic, the device may be likewise mapped. A user and social identifier graph may thus be constructed 330.

This mapping procedure may produce a mapping of a cellular user IDs to multiple users. For example, if two users share the same device (for example, cell phone) then both users will be mapped to the same cellular user ID. This can be a problem when a user borrows the cell phone of another user to check her email. In this case, both of the users will be mapped to the same phone, even if it was a temporary event. To deal with such issues, the system may take into consideration the frequency of use of the various social network IDs on each cellular device, and make a mapping/update the mapping based on the elapsed time since the last association. For example, when a new mapping between a user (user device) and a social identifier is made 340, it may be added to the user and social identifier graph. Likewise, infrequent mappings that are discovered 350 may be removed therefrom.

Weights between the ID mappings may be introduced in order to capture the frequency of the associations. Optionally, the cellular operator can use other sources to establish this mapping between cellular user ID and social network ID. Examples of such other sources may include a user's subscription information that already stores some social user IDs in the OSS/BSS databases of the cellular operator, or third party services that aggregate from multiple social networks user IDs that correspond to the same user.

Referring to FIG. 3, an example of information graph construction is illustrated. Given the super-graph of all the discovered social networks and the mapping of the cellular user IDs to the user IDs in each of the social networks, the system 110 produces an information graph. The information graph captures the possible ways that information can propagate based on social interactions between users. The information graph $G^i(V^i, E^i)$ may be produced as follows.

Given the super-graph $G^s(V^s, E^s)$ of the discovered social networks, all vertices in $G^s$ that map to the same cellular user ID become one vertex in the information graph $G^i$. An edge E between two vertices V in $G^i$ exists if and only if there is at least one edge in $G^s$ that connects two vertices of $G^s$ which map to the two vertices in $G^i$.

The information graph may be kept up to date based on the changes that happen in the super-graph of all the discovered social networks and the mapping of IDs between cellular user IDs and social network IDs. Optionally, the edges of the information graph can be assigned different weights, by combining with various aggregation functions the weights of the edges in the super-graph and the ID mappings. Each edge may have one weight representing the probability of any information crossing the link, or multiple weights capturing the propagation probability given the type of information or the direction of the propagation.

The user mobility modeling module 140 provides information on the expected location of the mobile users, such as those predicted to be consumers of the content. An example way in which user mobility prediction models may be constructed is by leveraging associations between a UE (user equipment) and an evolved NodeB (base station, eNodeB). Service providers regularly retain records of such associations, and these records provide an excellent source of data to create user mobility models. As these associations are well documented, extensive description is omitted here.

This ability to construct mobility models may be extended to not only use capabilities of network devices (for example, at the base station) but also or alternatively to use capabilities available in the end user device. The end user device may cache its location determined by a variety of means (for example, availability of a WiFi access point in the neighborhood, GPS, et cetera) and periodically upload this information to a data center where this data is processed to construct accurate user mobility models.

Additionally, a (logical) module may be utilized in terms of multiple inter-connected physical modules to preserve privacy and hence increase acceptance of the data mining by the users, and also to lower the cost associated with safekeeping of private customer data. Thus, an embodiment may include a privacy preserving module that provides for deep analysis of customer behavior and patterns, such as are currently used to customize products and services offered to customers. Examples of such deep analysis include analysis of shopping carts at the level of individual customer, tracking of website visits/browsing behavior by the means of cookies, and personalization/recommendation (as found in FACEBOOK network recommendation systems). Nonetheless, concerns may remain about privacy.

In particular, individual user mobility profiles may be considered highly private. In order to safeguard the privacy of user mobility, in the example methods described above, the device application may add a pre-defined level of uncertainty before reporting the user location. A cryptographic module may be used in the user mobility modeling module that creates encrypted versions of the user identity, and provide that the rest of the calculation proceeds on the basis of these encrypted IDs instead of the actual user ids. Thus, only the cryptographic module may possess the key that can be used to find the actual users. The key used by the cryptographic module furthermore may be changed on a periodic basis to limit the potential seriousness that may be created in case a key leaks out during a system intrusion.

Another interesting feature is the fact that the end goal may be to compute cache content policies that only depend on the content, not on the users (for example, for download streams). The privacy sensitive portions of the calculation, such as the user mobility models and information flow graphs, may be used as inputs to compute the cache content policy. While a cache content policy should be distributed to the edge of the network, its calculation itself need not be distributed and may be performed in a more secure location that is heavily shielded against system intrusions.

Figure 4:
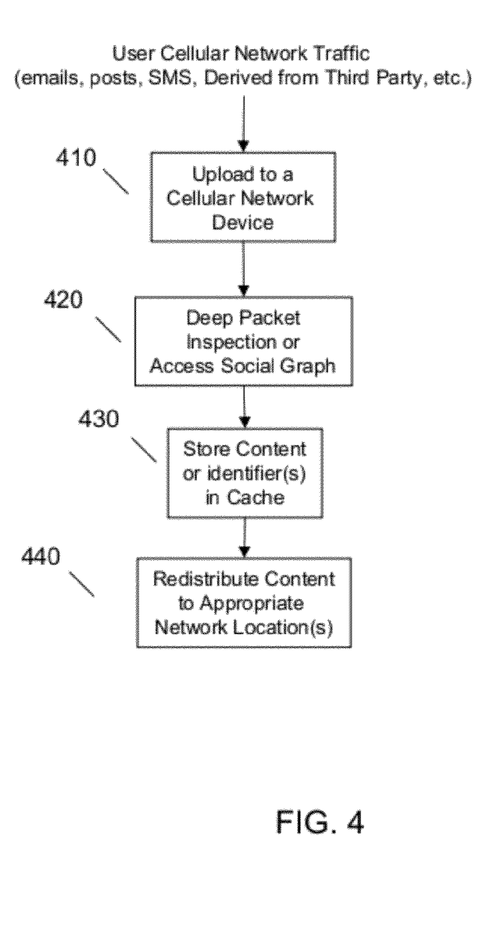
FIG. 4 illustrates an example of content discovery for predictive content placement.

Referring to FIG. 4, the content discovery, placement and monitoring module 150 is responsible for discovering the content to be distributed, and scheduling and monitoring its distribution according to the evolution of its popularity and the mobility patterns of the users. This functionality is further described as follows.

For content discovery, the content may be discovered by employing deep packet inspection techniques on the data traffic that is transmitted from the mobile user to the cellular network. Content discovery may be performed directly on content that is being transmitted or indirectly on an identifier that points to it. Performing content discovery refers to user generated content, for example when a user uploads 410 content, such as a photo or a video, that has been captured through his or her mobile device to a cellular network device. Deep packet inspection techniques may be employed 420 to identify the format of the content and store it 430 as an object in a local cache. Alternatively, content may be identified via accessing a user's social graph information. For example, social graph information available from a third party may be accessed responsive to a user opt-in to allow discovery of social network APIs that indicate which content is posted to a social network account. Once cached, the content may be further re-distributed 440 to appropriate location(s) in the network.

Deep packet inspection techniques can also recognize and intercept the use of specific protocols (for example, Internet) for file uploads, such as the RFC 1867 (http file uploads), RFC 959 (FTP), and RFC 2388 (values from forms). The content type can also be retrieved, or the presence of MIME content (RFC 2046) in HTTP or email messages may be discovered.

Another example method of content discovery may be performed by intercepting a Uniform Resource Locator (URL) that a user is sharing or posting to a social network that he or she is a member of. For example, when a user shares a web link (URL) of some multimedia content to his or her FACEBOOK page or "re-tweets" the content through TWITTER, this action can be used for content discovery. In that case, the message that shares (or re-tweets) the link may be intercepted by using deep packet inspection techniques that can interpret the respective social network protocol. As above, a still further method for content discovery may be performed by consulting external services, such as the social network services. The social network services are the services from which content updates, as generated by the users, can be retrieved, for example through a user opt-in. In another embodiment, content discovery may be achieved through a user opt-in wherein users opt to make known the content that they publish to the content distribution service of the cellular network, either with or without specific incentives.

With regard to the information graph discovery and monitoring module 130, described in connection with a cellular network, an embodiment may be extended beyond social applications (emails, SMS, TWEETs/messages, FACEBOOK communications, et cetera). An embodiment may analyze other types of application layer interactions that then may be used in order to proactively place content at the appropriate network nodes. For example, two broad classes of non social-based applications that can be exploited for that purpose (with a description of how CDNs can take advantage thereof) are as follows.

For subscription-based applications, such as NETFLIX applications, RSS subscription feeds (video/audio podcasts, news feeds, et cetera), et cetera, users specify a set of content that are interested consuming at some point in the near future (as opposed to instantly). As in the case of social applications, the user preferences for subscription-based application may be intercepted and analyzed so that content can be proactively pushed to the appropriate network locations. NETFLIX is a registered trademark of Netflix, Inc. in the United States and other countries.

For location-based applications, such as movie theater listings at a location (trailers, reviews, et cetera), rental/house listings, et cetera, depending on the location, these applications provide different data to differently located users. In addition, for some of these applications, users may provide preferences in order to filter out content that are not interesting to them. Again, it is possible to analyze those applications and proactively place content that users are likely to access given their location and their preferences.

In general, by intercepting and analyzing application layer messages, an extended graph (like the OpenGraph, supported by the FACEBOOK API) may be generated that not only captures the social interactions of users but the interaction of users with other real world entities (or even between real-word entities). This extended information graph constructed in this manner then may be utilized in order to facilitate personalized placement of content that individual users are likely to access.

Figure 5:
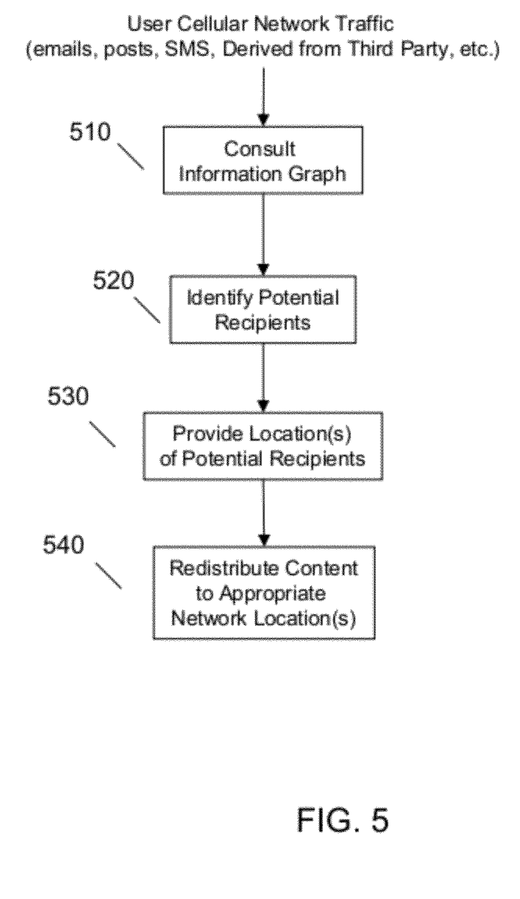
FIG. 5 illustrates an example of predictive content placement.

Referring to FIG. 5, for content placement, the content discovery, placement and monitoring module 150 may redistribute the content to appropriate network locations. This task determines where the discovered content should be placed in the network so as to minimize the backhaul bandwidth requirements as it is being requested by other users. Additionally, the most appropriate time when the content will be transferred and cached at the network location according to the placement decision may also be made, so as to minimize network load incurred by these transfers.

The information network graph and the user mobility prediction model may be employed to make these decisions about the where and when of content placement in the network. As an example, the information graph that is constructed for the cellular network users may be consulted 510 to identify 520 potential recipients of content that a user has published. This set of potential recipients can be further refined based on the particular social network through which the user published (or made available) the content, as this subset of users is most likely to be notified about the new content that was published by one of their user-links.

Once the set of potential recipients has been identified, the user mobility prediction model can provide 530 an ordered (and potentially time-stamped) set of locations where these users most likely might be found. This set of locations may include for example the IDs of BTS/NodeBs/eNodeBs that each user is expected to visit in the next few hours or days. Content can be proactively re-distributed 540 to caches that are close to (or on) these locations, so as to bring it as close as possible to the potential recipients. Moreover, in a case where multiple potential recipients of the content happen to reside in the same location, either at the same time, or within a certain finite time interval (during which the content is stored at the local cache of that location), bandwidth is saved by serving the content without utilizing the backhaul network of the cellular network.

The time when the transfer (re-distribution or placement) of content to the local cache takes place may also determined by the user mobility prediction model. For example, the time when a potential recipient of user generated (or endorsed) content is expected to arrive at a certain location sets a time limit during which this content needs to be found at the local cache. However, the actual time when this transfer takes place may be chosen so as to evenly spread the traffic load that is served by the backhaul network and avoid traffic spikes, while respecting the aforementioned time limit. Thus, the a benefit for placing user-generated content close to the locations where it will most likely be requested will be achieved at the locations where the largest number of the most possible recipients of that content might reside. The latter is highly likely due to the structure of social networks, which tend to include a large number of links (friends) that are geographically close to each other.

For, monitoring and updating of content placement, the example system 110 described herein may include a module that monitors (for example, continuously or periodically) various statistics regarding the requests for content and mobility (or association) patterns of the potential recipients of that content. This creates a feedback loop that adapts the content placement, as predictions on the users and their location are proven correct or false. For example, if a potential recipient of a certain content, as has been identified by the social graph of the user that published/shared that content, is not found at the location that has been predicted using the user mobility prediction module, then a scheduled placement of that content at that location might be abandoned or modified. Similarly, if a user that has been identified as potential recipient (requester) of some content re-publishes/shares it within his or her own circle of social links (friends), then the set of potential recipients of that content may be expanded. This fact may be further fed back to the content discovery, placement and monitoring module 150 in order to select new locations (or increase the time duration during which a cache will keep the content at a certain location) due to the new potential audience that has been created.

Figure 6:
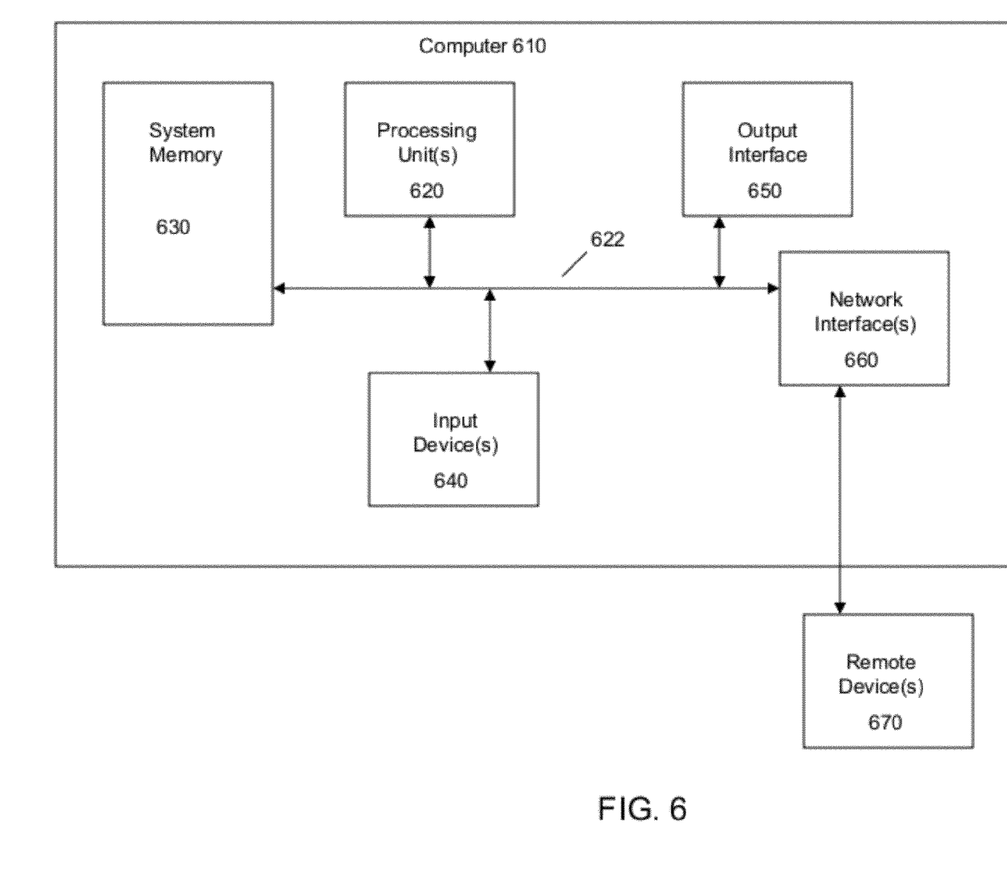
FIG. 6 illustrates an example computing device.

Referring to FIG. 6, it will be readily understood that certain embodiments can be implemented using any of a wide variety of devices or combinations of devices. An example device that may be used in implementing embodiments includes a computing device in the form of a computer 610, which may take the form of a server, a workstation computer, a mobile device, and the like. In this regard, the computer 610 may execute program instructions configured to provide predictive placement of content through network analysis, and perform other functionality of the embodiments, as described herein.

Components of computer 610 may include, but are not limited to, at least one processing unit 620, a system memory 630, and a system bus 622 that couples various system components including the system memory 630 to the processing unit(s) 620. The computer 610 may include or have access to a variety of computer readable media. The system memory 630 may include computer readable storage media in the form of volatile and/or nonvolatile memory such as read only memory (ROM) and/or random access memory (RAM). By way of example, and not limitation, system memory 630 may also include an operating system, application programs, other program modules, and program data.

A user can interface with (for example, enter commands and information) the computer 610 through input devices 640. A monitor or other type of device can also be connected to the system bus 622 via an interface, such as an output interface 650. In addition to a monitor, computers may also include other peripheral output devices. The computer 610 may operate in a networked or distributed environment using logical connections (network interface 660) to other remote computers or databases (remote device(s) 670). The logical connections may include a network, such local area network (LAN), a wide area network (WAN), a cellular network, but may also include other networks.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in computer readable medium(s) having computer readable program code embodied therewith.

Any combination of computer readable medium(s) may be utilized. The computer readable medium may be a non-signal computer readable medium, referred to herein as a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any programming language or combinations thereof, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects have been described herein with reference to flowchart illustrations and/or block diagrams of methods, apparatuses, systems and computer program products according to example embodiments. It will be understood that the blocks of the flowchart illustrations and/or block diagrams, and combinations of blocks in the flowchart illustrations and/or block diagrams, can be implemented by computer program instructions. These computer program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer, or other programmable apparatus, provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A computer program product comprising:
   a non-transitory computer readable storage medium having computer readable program code embodied therewith, the computer readable program code comprising:
   computer readable program code configured to intercept content upload data indicating content uploaded by one or more users from a network location;
   computer readable program code configured to ascertain one or more users predicted to access said content based on said one or more users providing said content upload data; and
   computer readable program code configured to place said content to one or more other network locations based on a dynamically constructed information graph comprising links between said one or more users providing said content upload data and said one or more users predicted to access said content, the information graph providing a model of at least one existing network connection between users which models propagation of information via one or more communication modalities;
   wherein said information graph comprises a super graph comprising links between said one or more users providing said content upload data and said one or more users predicted to access said content;
   wherein said links comprise at least one of the following (a) and (b);
   (a) links derived from a social networking account of said one or more users providing said content upload data; and
   (b) links derived from deep packet inspection of network communication of said one or more users providing said content upload data.

2. The computer program product according to claim 1, wherein to ascertain one or more users predicted to access said content further comprises ascertaining one or more network locations associated with said one or more users predicted to access said content.

3. The compute program product according to claim 2, wherein ascertaining one or more network locations associated with said one or more users predicted to access said content further comprises: constructing a user mobility model indicative of one or more network locations associated with said one or more users predicted to access said content.

4. The computer program product according to claim 3, wherein said one or more network locations comprise one or more of: a wireless access point and a cellular base station.

5. The computer program product according to claim 3, wherein constructing a user mobility model indicative of one or more network locations associated with said one or more users predicted to access said content further comprises:
   constructing a user mobility model using data derived from mobile devices of said one or more users predicted to access said content; and
   constructing a user mobility model using data derived from a cellular network account of said one or more users predicted to access said content.

6. The computer program product according to claim 4, wherein the data derived from mobile devices of said one or more users predicted to access said content is protected to provide privacy to said one or more users predicted to access said content.

7. The computer program product according to claim 1, wherein to place said content to one or more other network locations based on said one or more users predicted to access said content further comprises caching said content within a network device located geographically close to a network access point utilized by said one or more users predicted to access said content.

8. The computer program product according to claim 7, wherein caching said content uploaded to a network device within a network device further comprises employing a predetermined content caching policy.

9. The computer program product according to claim 8, wherein the predetermined content caching policy takes into account one or more of: time of day and network bandwidth capabilities.

10. A method comprising:
intercepting content upload data indicating content uploaded by one or more users from a network location;
ascertaining one or more users predicted to access said content based on said one or more users providing said content upload data; and
placing said content to one or more other network locations based on a dynamically constructed information graph comprising links between said one or more users providing said content upload data and said one or more users predicted to access said content, the information graph providing a model of at least one existing network connection between users which models propagation of information via one or more communication modalities;
wherein said information graph comprises a super graph comprising links between said one or more users providing said content upload data and said one or more users predicted to access said content;
wherein said links comprise at least one of the following (a) and (b);
(a) links derived from a social networking account of said one or more users providing said content upload data; and
(b) links derived from deep packet inspection of network communication of said one or more users providing said content upload data.

11. The method according to claim 10, wherein ascertaining one or more users predicted to access said content further comprises ascertaining one or more network locations associated with said one or more users predicted to access said content.

12. The method according to claim 11, wherein ascertaining one or more network locations associated with said one or more users predicted to access said content further comprises:
constructing a user mobility model indicative of one or more network locations associated with said one or more users predicted to access said content.

13. The method according to claim 12, wherein said one or more network locations comprise one or more of: a wireless access point and a cellular base station.

14. The method according to claim 12, wherein constructing a user mobility model indicative of one or more network locations associated with said one or more users predicted to access said content further comprises:

constructing a user mobility model using data derived from mobile devices of said one or more users predicted to access said content; and
constructing a user mobility model using data derived from a cellular network account of said one or more users predicted to access said content.

15. The method according to claim 14, wherein the data derived from mobile devices of said one or more users predicted to access said content is protected to provide privacy to said one or more users predicted to access said content.

16. The method according to claim 10, wherein placing said content to one or more other network locations based on said one or more users predicted to access said content further comprises caching said content within a network device located geographically close to a network access point utilized by said one or more users predicted to access said content.

17. The method according to claim 16, wherein caching said content uploaded to a network device within a network device further comprises employing a predetermined content caching policy.

18. The method according to claim 17, wherein the predetermined content caching policy takes into account one or more of: time of day and network bandwidth capabilities.

19. A system comprising:
at least one processor; and
a memory device operatively connected to the at least one processor;
wherein, responsive to execution of program instructions accessible to the at least one processor, the at least one processor is configured to:
intercept content upload data indicating content uploaded by one or more users from a network location;
ascertain one or more users predicted to access said content based on said one or more users providing said content upload data; and
place said content to one or more other network locations based on a dynamically constructed information graph comprising links between said one or more users providing said content upload data and said one or more users predicted to access said content, the information graph providing a model of at least one existing network connection between users which models propagation of information via one or more communication modalities;
wherein said information graph comprises a super graph comprising links between said one or more users providing said content upload data and said one or more users predicted to access said content;
wherein said links comprise at least one of the following (a) and (b);
(a) links derived from a social networking account of said one or more users providing said content upload data; and
(b) links derived from deep packet inspection of network communication of said one or more users providing said content upload data.

* * * * *